Oct. 1, 1968  D. F. JANOUS  3,403,559
ELEMENT PISTON LUBRICATOR
Filed April 5, 1965

INVENTOR.
DONALD F. JANOUS
BY *Hill, Sherman, Meroni, Gross & Simpson* ATTORNEYS 0
United States Patent Office 3,403,559
Patented Oct. 1, 1968

3,403,559
ELEMENT PISTON LUBRICATOR
Donald F. Janous, Chicago, Ill., assignor to The Dole Valve Company, Morton Grove, Ill., a corporation of Illinois
Filed Apr. 5, 1965, Ser. No. 445,397
1 Claim. (Cl. 73—368.3)

ABSTRACT OF THE DISCLOSURE

A temperature responsive force transmitting device having a casing with a piston slidable within the casing. A lubricant well is formed within the upper outer end of the casing. A seal is provided to close the lubricant well and this seal slidably engages the piston in fluid-tight engagement and is staked to the casing. The seal insures that the lubricant will be effective to lubricate the piston over a long period of time.

---

Figure 1:
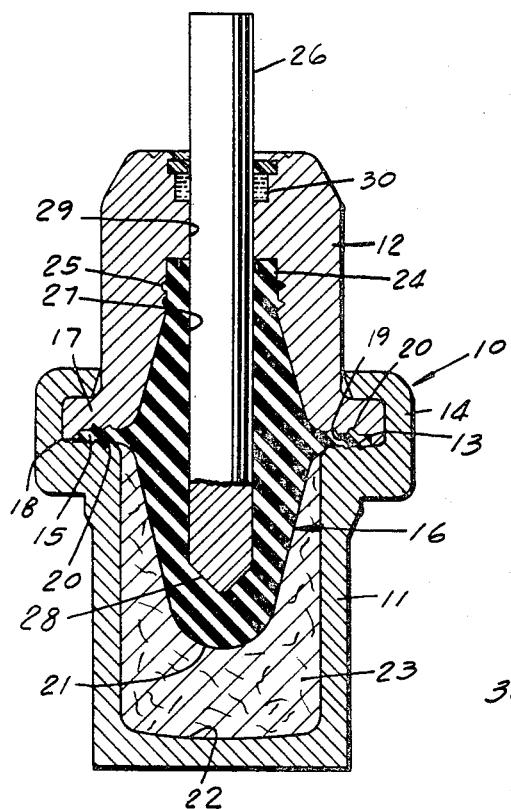

This invention relates to an improved temperature responsive force transmitting device and more particularly relates to a solid filled power element having a power member or piston slidable within the casing thereof and to a means for providing lubrication for the power member to increase the operating efficiency of the power element and lengthen the life thereof.

The usual wax-filled temperature responsive force transmitting device includes a casing filled with a temperature sensitive wax or other like material and a diaphragm or boot sealing the wax within the casing and a power member or piston carried by or on the boot and slidably positioned within a guide bore in the casing. Upon increases in temperature ambient the sensing portion of the power element to a predetermined range, the wax expands and acts against the boot to force the power member to move relative to the casing within the guide bore. Biasing means may be provided to return the power member retractably relative to the casing upon cooling of the element. Such power elements may cycle thousands of times and wear at the power member-casing interface may tend to shorten the life of the element, provide an access opening to the interior of the casing for the entry of fluids or undesirable foreign matter, and cause the untimely formation of burrs or the like which might interfere with the designed operativeness of the unit. Functional tests in the laboratory have shown that the provision of means for lubricating the piston can double the stable service life of an element in whose design it is included.

In accordance with the present invention, a lubricant well is formed within the upper outer end of the casing and this well constitutes an enlarged diameter section of the guide bore and is filled with a lubricant. A Teflon seal is provided to close the lubricant well and this seal slidably engages the power member in fluid-tight engagement and is staked to the casing.

The snug fit of the casing, power member, and Teflon seal insures that the lubricant will be effective to lubricate the power member over a long period of time and through a great many operative cycles.

In view of the foregoing, it is a principal object of the present invention to provide an improved temperature responsive force transmitting device having means for lubricating the power member.

Another and more specific object of the invention resides in the provision of a lubricant well within the casing of a power element, which well comprises an enlarged section of the power member guide bore and is filled with lubricant.

Yet another object of the invention resides in the provision of a thermal element having the lubricant means described above wherein a Teflon seal or other lubricating plastic is employed to close the lubricant well and provide a means for preventing loss of the lubricant contained therein.

Figure 2:
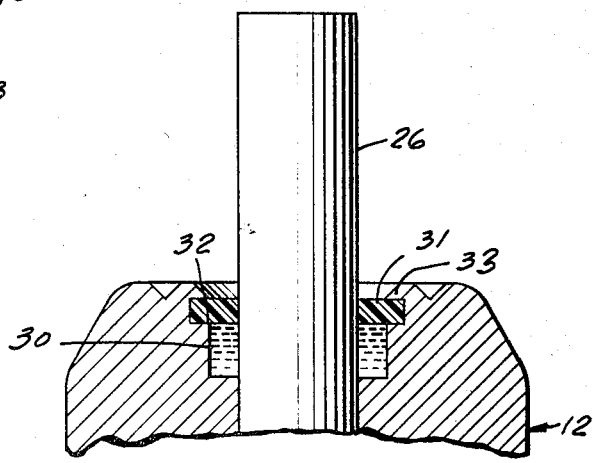

The foregoing objects, features and advantages of the present invention will become apparent from time to time as the following specification proceeds and with reference to the accompanying drawing, wherein:

FIGURE 1 is a vertical sectional view of a temperature responsive force transmitting device constructed in accordance with the present invention; and FIGURE 2 is an enlarged fragmentary vertical sectional view of a portion of the thermal sensitive element shown in FIGURE 1 and showing the power member in side elevation.

The thermal sensitive element or temperature responsive force transmitting device includes a two-part casing 10 having a lower cup-shaped temperature sensing portion 11 and an upper inverted cup-shaped member 12. The member 11 has a generally horizontally extending annular shoulder 13 formed integrally therewith which terminates in an upwardly extending annular flange 14.

The annular rim 15 of a rubber boot 16 is seated on the shoulder 13 and terminates at a point spaced somewhat radially inwardly from the upwardly extending annular flange 14. The upper inverted cup shaped member 12 has a horizontally outwardly extending flange 17 formed integrally therewith and this flange provides a shoulder 18 facing the shoulder 13 and seated on the lip 15 of the boot 16. An annular rim 18 is formed integrally with the flange 17 and seats on the shoulder 13 to insure that the spacing between shoulders 13 and 18 will be exactly as desired. The annular lip 15 of the boot 16 has a thickness somewhat greater than the distance between the shoulders 13 and 18 when the lip is in its unstressed condition so that it is somewhat squeezed when the rim 18 is forced down to its seated position on the shoulder 13.

Grooves 20 are formed about the shoulders 13 and 19 and these grooves are filled with the material of the lip 15 of the boot 16 when the lip is squeezed between the two shoulders. A positive fluid-tight seal is thus provided between the two sections of the casing and the boot 16.

The boot 16 has a depending section which tapers downwardly to a rounded bottom portion 21 which portion terminates at a point spaced upwardly a substantial distance from the base 22 of the cup-shaped interior of the casing 10. The interior of the lower section 11 of the casing 10 not occupied by the boot 16 is completely filled with a thermal responsive wax 23 which is expansible upon increases in temperature ambient the lower section of the casing. The lower section 11 of the casing 10 (as well as the upper section 12, preferably) is formed of a metal which is a good heat conductor so that operation of the unit will not lag too far behind variances in ambient temperature.

The interior of the upper section 12 converges from the shoulder 19 to a cylindrical inner wall 24 and the wall 24, like the shoulders 13 and 19, is grooved as indicated at 25 to insure that the material of the boot 16 fitted within the cylindrically walled section 24 will be positively secured in position and not pull away from the illustrated location.

A piston or power member 26 protrudes from the upper end of the casing 10 and extends down into the boot 16, terminating only a short distance above the rounded bottom portion of the boot. The piston 26 fits snugly within a complementary cylindrically configurated bore 27 in the boot 16 and has a conically configurated lower end 28 which fits within a complementary shaped section of the boot bore 27.

An elongated cylindrical guide bore 29 is formed within the upper section 12 of the casing 10 and it is at this metal-to-metal interface that wear becomes a problem. An annular lubricant well 30 is formed within the upper section 12 of the casing 10 and comprises an enlargement of the guide bore 29 and encircles the piston 26. The lubricant well 30 is filled with a flowable lubricant of a type particularly suitable for lubricating the metals at the piston-to-guide bore interface. A Teflon seal 31 is seated on a radially enlarged shoulder 32 formed about the upper part of the lubricant well 30 and an annular rim 33 of the upper section 12 is staked over the seal 31 to maintain the seal in the position illustrated in the drawings. The seal is held tightly against the shoulder 32 and snugly engages the wall of the piston 26 so as to insure that lubricant will not escape from the well 30. Since Teflon is a lubricating plastic itself and since aperture-enlarging movement of the piston is largely prevented by the snug mounting of the piston within the guide bore 29, enlargement of the aperture in the Teflon seal through which the piston extends does not occur in practice to a degree sufficient to cause loss of the lubricant within the well 30.

It will be understood that various modifications and variations in the present invention may be effected without departing from the spirit and scope of the novel concepts thereof.

I claim as my invention:

1. A temperature responsive force transmitting device comprising:
    a base cup formed of a heat exchange metal and having an outturned annular flange;
    a resilient boot having an integral annular bead formed therearound and lying on said flange and having a base portion depending therefrom within said base cup and a neck portion extending upwardly therefrom;
    a piston guide cup having a well fitting snugly around the said neck portion of said boot and having an outturned flange seated on said bead;
    a rim formed about the periphery of one of said flanges and extending therefrom a distance less than the thickness of said bead in its unstressed condition;
    an elongated cylindrical piston guide bore formed within said piston guide cup;
    a cylindrically configurated piston snugly received within said piston guide bore and guided for rectilinear movemement within said bore and seated on said base portion of said boot;
    whereby expansion of the said thermally expansible material will cause said piston to move extensibly from said guide;
    a plurality of continuous spaced grooves formed along the inner wall of said guide cup within said well and within the bead-engaging faces of each said flanges;
    an annular wall extending outwardly from one of said flanges around the other of said flanges and crimped over the other of said flanges whereby to maintain said rim in engagement with the first mentioned flange so as to maintain said bead and said neck portion of said boot under compression to force portions of said boot into the said grooves;
    a cup-shaped lubricant well opening to the outer end of said piston guide cup in surrounding relation to said piston and comprising an enlargement of said piston guide bore;
    a flowable lubricant contained within said well; and
    a lubricant seal formed of a self-lubricating plastic material sealed to said piston guide cup in fluid-tight relation and embracing and snugly receiving said piston
whereby to prevent seepage of lubricant from said lubricant well.

References Cited
UNITED STATES PATENTS

| | | | |
|---|---|---|---|
| 1,971,542 | 8/1934 | Taylor | 184—24 X |
| 2,035,450 | 3/1936 | Barnes | 184—24 |
| 2,208,149 | 7/1940 | Vernet | 73—368.3 X |
| 3,016,747 | 1/1962 | Vernet | 73—368.3 |
| 3,212,337 | 10/1965 | McCarrick | 73—368.3 |

S. CLEMENT SWISHER, *Primary Examiner.*

WILLIAM HENRY II, *Assistant Examiner.*